United States Patent [19]
Ellis, Jr.

[11] Patent Number: 5,203,970
[45] Date of Patent: Apr. 20, 1993

[54] METHOD FOR WATER DEGASIFICATION AND DISTILLATION

[76] Inventor: John C. Ellis, Jr., 1084 Palmer Ave., Larchmont, N.Y. 10538

[21] Appl. No.: 486,228

[22] Filed: Feb. 28, 1990

[51] Int. Cl.$^5$ .................. B01D 3/02; B01D 19/02; C02F 1/04
[52] U.S. Cl. .................. 203/10; 202/175; 202/176; 202/180; 202/202; 202/203; 202/265; 203/4; 203/22; 203/DIG. 18; 203/DIG. 22
[58] Field of Search ............ 202/175, 176, 203, 185.5, 202/265, 180, 202, 181, 188, 196; 203/10, 4, 1, 2, 22, DIG. 18, DIG. 22; 55/36

[56] References Cited
U.S. PATENT DOCUMENTS

| | | | |
|---|---|---|---|
| 567,434 | 9/1896 | Young | 202/175 |
| 841,401 | 1/1907 | Hope | 202/175 |
| 1,307,508 | 6/1919 | Meakin et al. | 202/175 |
| 2,779,723 | 1/1957 | Prymek | 202/165 |
| 3,794,566 | 2/1974 | Raal | 202/202 |
| 3,891,395 | 6/1975 | Winkler | 159/901 |
| 3,980,526 | 9/1976 | Kirschmann | 202/234 |
| 4,045,293 | 8/1977 | Cooksley | 203/10 |
| 4,089,750 | 5/1978 | Kirschman et al. | 203/10 |
| 4,214,454 | 7/1980 | Taylor | 203/10 |
| 4,269,663 | 5/1981 | McFee | 203/10 |
| 4,342,623 | 8/1982 | Loeffler | 203/10 |
| 4,612,090 | 9/1986 | Ellis, Jr. | 203/10 |

FOREIGN PATENT DOCUMENTS
88/09308 12/1988 World Int. Prop. O.

*Primary Examiner*—Virginia Manoharan
*Attorney, Agent, or Firm*—Wegner, Cantor, Mueller & Player

[57] ABSTRACT

A method for water degasification and distillation in an apparatus having a container for a reservoir of water to be degasified and distilled, a relatively small boiler adjoining the container and having a feed water conduit connecting the container and boiler so that a selected water level in the container will fill the boiler to the same level, a coiled tube condenser within the container immersed in the water therein, the condenser coil having a vertically disposed longitudinal axis, a second conduit in the boiler connecting the space above the water level therein to the inlet of the condenser so that steam flows from the boiler to the condenser, an outlet on the condenser extending through a container wall for discharging the condensed steam as degasified distilled water, a heater in the boiler for heating the water therein, and a motor driven stirrer axially of the coiled tube condenser for generating a swirling movement of the reservoir water with formation of steam bubbles therein.

Optionally, an oversized filter is mounted at the outlet of the condenser.

2 Claims, 2 Drawing Sheets

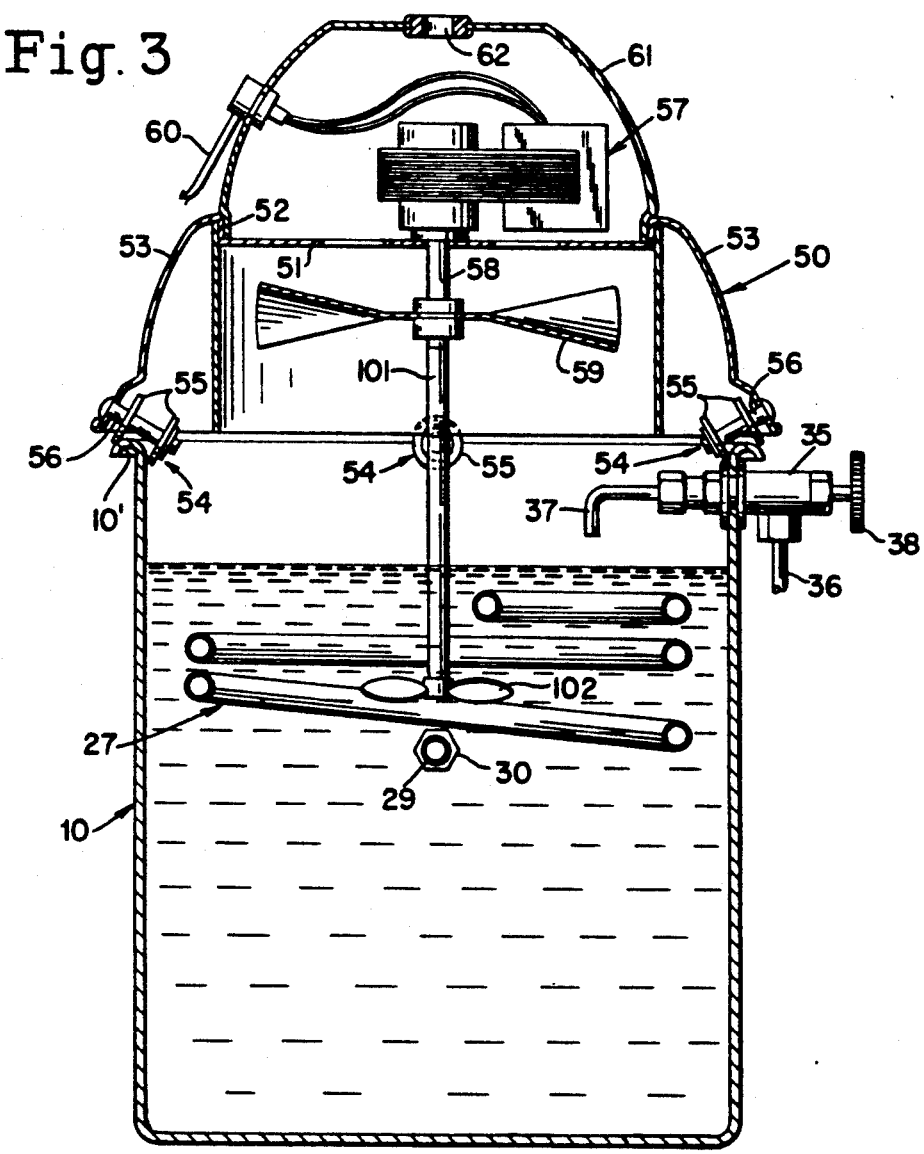
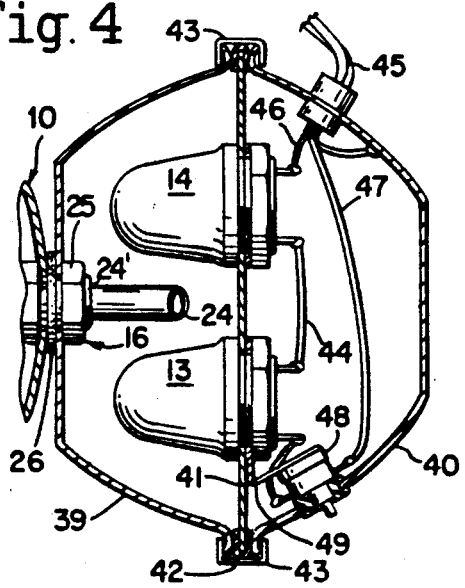
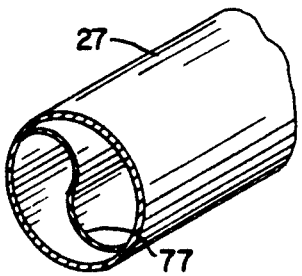
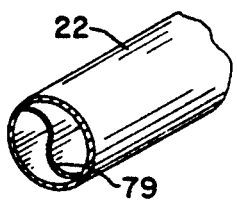

METHOD FOR WATER DEGASIFICATION AND DISTILLATION

INTRODUCTION

This invention relates to a distilling apparatus and more specifically to a novel and improved water degasification and distillation apparatus embodying improved means for oiling off any volatile constituents present in the water prior to distillation thereof.

Known water distilling apparatus generally comprise: a closed boiler; means for continuously feeding water to the boiler means for removing and means for condensing the steam and other vapors evolved in the boiler. As the water in the boiler is being heated to produce steam, any volatilizable chemical components present in the water will boil off and combine with the steam being evolved. Then the steam together with the volatilized chemical components will become condensed in the condenser so that the resultant distillate will contain therein the (volatile) chemicals. In instances wherein the raw water exhibits a disagreeable odor such as is produced by sulphur compounds and the like, most of the known to the art distillation apparatus will tend to concentrate the odor compound in the distillate and make the distilled water even more distasteful than the raw water. The inventor hereof has long been concerned with this problem and is the inventor of several patents directed to improved water distillation and degasification systems.

The water distilling apparatus of this invention relates to the apparatus described in Applicant's prior patents U.S. Pat. Nos. 4,420,374 and 4,612,090, which patents in turn constitute an improvement over the apparatus disclosed in Applicant's earlier patent U.S. Pat. No. 4,339,307. Briefly, the water distilling apparatus described in the above-referenced patents U.S. Pat. Nos. 4,420,374, 4,612,090 comprises a very small boiler containing therein an instantaneous heating means and a reservoir for the boiler much larger than the boiler. A condensing coil is immersed within the reservoir so the water in the reservoir functions to cool the condenser. An open connection between reservoir and boiler provides an automatic water supply for the boiler.

The water in the reservoir circulates to and from the boiler, and the boiler heat thus imparted directly to the water in the reservoir together with the heat imparted to the reservoir water from the condenser heats the reservoir water to a temperature that will effectively deaerate the water in the reservoir and boil off any volatilizable constituents present in the water in the reservoir.

The water degasification and distillation apparatus in accordance with these above-referenced patents and in accordance with the invention hereof, comprises in more detail, a relatively large reservoir container adapted to receive the water to be distilled and a small boiler mounted on and to one side of the reservoir. A fluid conduit connects the boiler and the reservoir so that the liquid level in the boiler will be controlled to the liquid level in the reservoir. A vapor outlet in the boiler above the water level thereof is coupled to the condenser coil disposed within the reservoir container and the condensate outlet of the condenser coil extends through the wall of the reservoir container. The condenser coil is positioned so that the liquid in the reservoir will cover a major part or all of the condenser coil. With this arrangement and with the heater(s) in the boiler energized, the water in the boiler will heat to boiling almost instantaneously and the steam generated in the boiler will be fed out to the condenser. Whenever the steam generated within the boiler exceeds the capacity of the boiler outlet to the condenser to remove the steam from the boiler the steam pressure will force water in the boiler through the fluid conduit back into the reservoir. Then, when the steam pressure is relieved (by outflow of water to the reservoir and of steam to the condenser), water will again flow from the reservoir into the boiler. Pulsation and recirculation of water as just described continues throughout during the operation of the distillation apparatus.

Since hot boiler water is returned to the reservoir through the fluid conduit periodically through the pulsation and since heat from the condenser is continuously added to the water within the reservoir, all water fed to the reservoir increases in temperature. In a word, the reservoir water becomes hot. Desirably, all undesirable volatile material contained in the water fed to the boiler is vaporized prior to entry of the water into the boiler and distillation thereof.

The cold water initially fed to the reservoir (at the top thereof) will normally sink to the bottom of the reservoir while hot water periodically recirculated from the boiler back into the reservoir container (near the bottom) will tend to rise. Thus, the water within the reservoir container tank is in constant movement and is mixing so that desirably all the water of the reservoir is maintained at about the same substantially elevated temperature so as to evolve the undesirable volatilizable components from the reservoir water before the water enters the boiler.

THE INVENTION

According to the present invention the water of the reservoir is mechanically stirred so as to agitate the water even more, generating a whirlpool motion and sufficient cavitation to cause bubble formation. Mechanical stirring does much more than just mix the reservoir water more thoroughly.

DISCUSSION OF THE INVENTION

Mechanical stirring by a stirrer blade generates localized high pressures in the water at the upstream blade face where the blade pushes the water aside as it stirs. Conversely, low pressure regions are generated in the water adjacent the stirrer blade at the downstream face thereof. In these localized low pressure regions in the heated reservoir cavitation occurs and steam flashes off into the cavitation bubbles or vaporizes so as to form the bubbles. The bubbles rise through the water and escape overhead from the reservoir. Along with the steam in the bubbles goes any other air and any volatilizable substances evolved from the hot reservoir water.

Operation of the mechanical stirrer generates a surprisingly extensive list of advantageous results. Degasification of the water in the reservoir is much improved. In particular, any relatively volatilizable chemical impurities in the feed water are thoroughly steamed out of the reservoir water before the water enters the boiler as is any air in the feed water. The operation of the distillation apparatus is improved. Less of an excess of (cool) feed water is required for operation of the distillation system, since generation of steam bubbles at the localized low pressure regions of the reservoir serves concomitantly to cool the reservoir water, maintaining thereby a greater temperature differential between the reservoir water and the steam inside the condenser coil. Also, operation of the condensing coil is improved by the superior heat exchange contact between the condensing coil and the (turbulent) mechanically stirred water in the reservoir.

THE APPARATUS OF THE INVENTION

In the apparatus of this invention, the tubular condenser is a tube coiled somewhat loosely into a cylinder shape so as to be open to flow of water between adjacent coils. The cylindrical coil is disposed with a vertical longitudinal axis, which axis may be coincident with the stirrer rod. It is noteworthy that any suspended solids, such as dust or sediment in the feed water will never become carried over into the boiler because centrifugal forces engendered in the reservoir water by the mechanical stirring pushes the suspended solids between the condenser coils toward the periphery of the reservoir and either is discarded with the excess reservoir water or remains at the periphery until the distillation apparatus is cleaned.

Preferably, the stirrer is made part of a fan assembly such as the fan assembly that forms part of the distillation apparatus described in the related patents U.S. Pat. Nos. 4,420,374 and 4,612,890. Conveniently, the stirrer rod can be made an extension of the fan rotor. Advantageously, the fan removes the steam and gases that bubble up from the reservoir water.

Optionally included in the distillation apparatus of this invention may be a deflector insert in the conduit connecting reservoir and boiler and/or in the condenser coil tubing. The deflector(s) generates spin and turbulence in the water passing between reservoir and boiler, and/or causes turbulent fluid flow adjacent the tubular wall of the condenser coil.

Optionally included in the distillation apparatus may be an oversized filter, desirably a charcoal filter, at the delivery end of the condenser.

The above and other advantages of the invention will become more apparent from the following description and accompanying drawings forming part of this Application.

BRIEF DESCRIPTION OF THE DRAWINGS

FIG. 3 is a cross sectional view of FIG. 1 taken along the line 3—3 thereof and illustrates air circulating means carried by the container; and FIG. 4 is a cross sectional view showing the boiler and a fragmentary portion of the tank taken along the line 4—4 of FIG. 2.

FIG. 5 is a diagrammatic view showing the condenser tube containing a deflector.

FIG. 6 is a diagrammatic view showing the fluid conduit containing a deflector.

Figure 1:
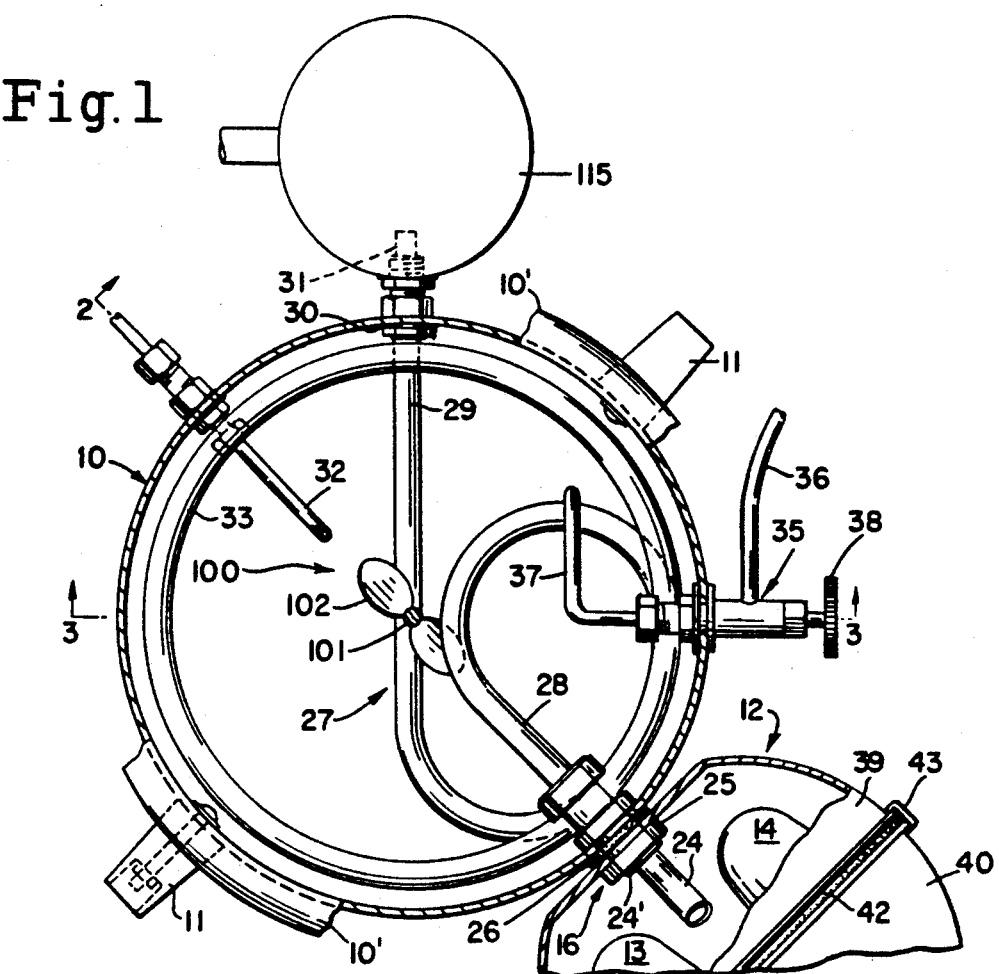
FIG. 1 is a fragmentary plan view of one embodiment of the distilling apparatus in accordance with the invention.
Figure 2:
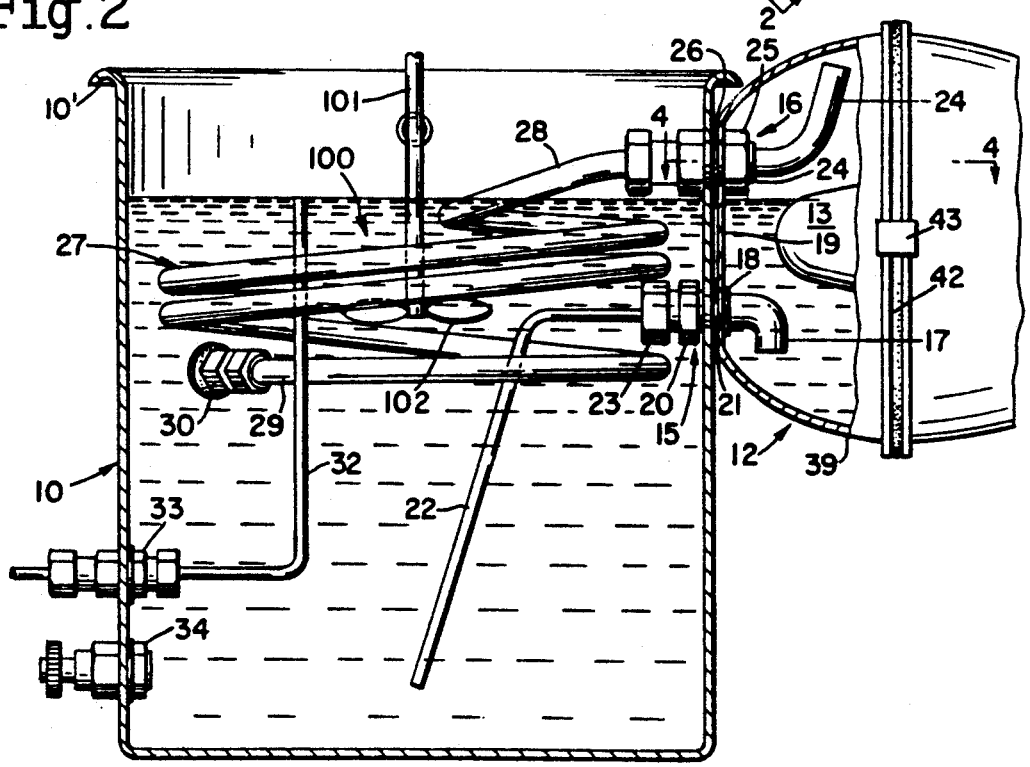
FIG. 2 is a cross sectional view of FIG. 1 taken along the line 2—2 thereof.

Referring now to the drawings and more specifically to FIGS. 1 and 2 it may be seen that the distilling apparatus in accordance with this invention comprises a cylindrical tank reservoir container 10 having a pair of handles 11 secured to the side thereof. A boiler 12 having instantaneous heating elements 13 and 14 therein is affixed to the side of the tank 10 by the fluid connectors 15 and 16. The fluid connector 15 includes an elbow 17 having a shoulder 18 and a threaded shank extending through cooperating openings in the wall 19 of the boiler 12 and the wall of the container 10. A nut 20 engages the shank of the fitting 15 and together with a resilient washer 21 provides a water-tight seal for both the tank 10 and the boiler 12. A water inlet conduit 22 is fixedly coupled to the fitting 15 by means of a nut 23 so that water within reservoir container 10 will automatically feed into the boiler 12 until the water level within boiler 12 corresponds to the reservoir water level inside reservoir container 10. It will also be observed that the water level is maintained at a level adequate to effect total or at least substantial immersion of the heating elements 13 and 14 in the water of boiler 12.

The steam outlet fitting 16 is of conventional construction and includes an outlet pipe 24, a threaded shank 24' extending through the walls of reservoir container 10 and boiler 12 and secured thereto by a nut 25. A sealing washer 26 is disposed between container and boiler to provide a watertight connection. In the preferred embodiment of the invention herein illustrated the condenser 27 is in the form of a coiled tube of metal such as stainless steel, copper or the like and has the inlet end portion 28 sealably connected to the fitting 16 within container 10. The outlet 29 of the condenser 27 has a fitting 30 extending through the wall of container 10 and provides the condensate outlet 31. Optionally, but desirably an oversized filter 115 is interposed at condensate outlet 31. As best may be seen in FIG. 1, the coiled condenser tubing generates a cylindrical region 100 at the center of the reservoir container 10. Reservoir container 10 further includes an overflow pipe 32 which is connected to a fitting 33 sealed to the wall of the container 10 and a drain cock 34 for draining water from the container (being useful for cleaning and maintenance). A water inlet valve 35 is at the upper portion of the reservoir container 10 and has an inlet 36, an outlet 37 and a hand-wheel 38 for regulating the water supply in order to maintain an appropriate supply of water to the reservoir container 10.

The boiler 12 is shown more clearly in FIG. 4 and in the preferred embodiment illustrated herein consists of two housing elements 39 and 40. A wall 41 disposed between the housing elements 39 and 40 includes a peripheral seal 42 which is releasably clamped between the outer rims of the housing elements 39 and 40 by clips 43 at the periphery of the boiler 12. This arrangement completely seals the boiler formed by the housing element 39 and the wall 41. The whole boiler can be readily disassembled for cleaning. The heating elements 13 and 14 in the illustrated embodiment are carried by the wall 41 and are connected in series by a lead 44 connecting one terminal of one heater to one terminal of the other heater. The power line 45 has one lead 46 connected to the other terminal of the heater 14 while the second lead 47 is connected through a thermostat 48 to the other terminal of the heater 13. The thermostat is mounted on a bracket 49 in close proximity to the heaters 13. In the event the heater 13 reaches a temperature above the normal operating temperature, the thermostat will operate to open the circuit and de-energize both heaters 13 and 14. It is evident, however, that the heaters 13 and 14 could be arranged for parallel operating or in the alternative a single electric heater may be employed in the boiler provided however it delivers the quantity of heat necessary for operation of the distillation apparatus.

In the preferred embodiment of the invention herein illustrated a forced air circulation means assists removal of steam and undesirable vapors liberated from the reservoir water within reservoir container 10. The air circulating means which is shown in FIG. 3 comprises an inverted dished cover generally denoted by the numeral 50 over reservoir container 10 which includes a flat upper wall 51 that is perforated or apertured, an upwardly extending peripheral wall 52 and a downwardly curved peripheral wall 53. The lower peripheral edge of the wall 53 carries three or more diagonally disposed rollers 54 each having spaced discs 55 rotatably carried by a shaft 56. The discs 55 engage the rolled edge 10' of the reservoir container 10 and accordingly provide an annular vent between the cover 50 and the top edge of the reservoir container 10.

The flat apertured wall 51 of the air circulating means supports an electric motor generally denoted by the numeral 57 which powers a shaft 58 extending through the perforated wall 51. The fan 59 is mounted on shaft 58. Power is fed to the motor 57 by a cable 60 connected in a conventional manner to the motor. If desired, switch means may be provided for operation of the fan. The fan motor 57 is covered by a vented dome-shaped housing 61 that is securely fitted to the cover 50 and is attached thereto by any suitable means. In the illustrated embodiment of the invention, the dome-shaped housing 61 frictionally engages the peripheral wall 52 of the cover 50.

In one mode of fan operation, air is drawn into the air circulating means assembly through an opening 62 in the dome-shaped housing 61 and then down through the perforated wall 51 whereupon it is directed downwardly over the reservoir water in reservoir container 10 and thereafter is discharged through the annular opening between the reservoir container 10 and its cover 50. In the reverse mode of fan operation the fan 59 draws air in through the annular opening between reservoir container 10 and its cover 50 up through perforated wall 51 and opening out through vent 62 in motor housing 61.

As may be seen in FIG. 3, a stirrer rod 101 extends from an integral connection with motor shaft 58 at the hub of fan 59 preferably but not necessarily axially of the cylindrical reservoir region 100 inside of condenser coil 27 and terminates at the stirrer blades 102 immersed in the reservoir water. The depth of immersion for stirrer blades 102 is not critical, but preferably, they are not deeper than the bottom of coil condenser 27. In the mode illustrated herein, the stirrer rod was positioned modestly off-center to avoid interference with the outlet bend 29 of condenser coil 27, see FIGS. 1 and 2.

In the operation of the distillation apparatus of this invention, the reservoir container 10 and boiler 12 are first filled with water to a level at least substantially covering the heating elements 13 and 14 as may be observed most clearly in FIG. 2. It will be observed that when filling reservoir container 10, water will automatically flow through conduit 22 into the boiler so that ultimately the level of the water in the reservoir container 10 will be the same as the water level in the boiler 12. When energy is then supplied to the heating elements 13 and 14 they will function to boil the water within the boiler 12. Steam from the boiler will enter the inlet 24 and then flow through the condenser coil 27 to be condensed therein. The condensed steam will then discharge through filter 115 as the distillate (liquid) product from the condenser outlet 31. When first operating the distillation apparatus, it is generally desirable to discard the distillate product until the water inside reservoir container 10 has attained a normal operating temperature which preferably is 180°-190° F. (which is rapidly attained). Heaters 13 and 14 are designed to heat the water within the boiler at a rate faster than the condenser coil 27 can accommodate the steam produced. Accordingly, a head of steam is developed within the boiler 12 and the steam pressure will force liquid from the boiler back through the conduit 22 into the reservoir container 10 thereby relieving the steam pressure. As soon as the steam pressure within the boiler is relieved, water will again flow through the conduit 22 back into the boiler with the result that there will be a periodic reversal of water flow through the conduit 22. This pulsating action results in a more rapid increase in temperature of the reservoir water within the container 10 by contributing heat over and above the heat imparted to the reservoir water by the action of the condenser coil 27. The temperature of the reservoir water, however, is always below the boiling temperature (of the water in boiler 12) so that distillate will be condensed in condenser 27. Preferably the reservoir water should be kept in the range of 180° F. to 190° F. This temperature level will boil off undesirable components from the reservoir water (prior to actual distillation thereof), and also serves to operate condenser 27 adequately. To maintain proper operation of the apparatus, a substantial proportion of the feed water which enters at the inlet 37 ultimately is discharged as overflow through tube 32 and outlet 35.

Operation of stirrer blades 102 materially changes the dynamics of the distillation apparatus. The stirrer blades 102 generate a whirling turbulent motion of water inside cylindrical space 100 thereby improving heat exchange contact between the reservoir water and the tubing of condenser coil 27. In addition, motion of the stirrer blades generate cavitation which in the distillation apparatus of this invention constitutes formation of steam bubbles beneath the surface of the water. Typically, the bubbles contain both steam and volatilized gases and vapors.

The rapid rotational movement of the stirrer blades 102 generates localized pressure differentials in the reservoir water causing an increased (and super-atmospheric) pressure on the upstream face of the blades and a decreased relatively negative (and sub-atmospheric) pressure on the downstream face of the blades. Since the water in the reservoir is hot, desirably at between 180°-190° F., generation of localized sub-atmospheric pressure regions in the water creates a void space into which steam flashes off from the hot water (forming thereby the bubbles). Evolved along with the steam, is any air still dissolved in the water and any volatilizable components still present in the water. Moreover, as the bubbles pass up through the reservoir water to escape at the water surface, they scavenge air and volatilizable components from the water.

Thus, mechanical stirring of the hot reservoir water assists greatly in deaerating the reservoir water and in removing all volatilizable components therefrom before water from the reservoir enters the boiler 12 to be distilled therein. In addition, mechanical stirring facilitates maintenance of a good heat balance within the reservoir.

In operation of the distillation apparatus, the heat imparted at boiler 12 by the heating elements 13 and 14 can leave the distillation apparatus only as the heat energy content of the hot (condensed steam) distillate product or of the hot reservoir water discarded through overflow pipe 32 or as the heat energy in the (heated) air and vapors vented by fan 59 (through either the annular vents in cover 50 or the opening 62 in motor housing 61 depending on how fan 59 is operated). To the extent that stirrer 102 causes cavitation and generation of steam bubbles in the reservoir water which bubbles in turn escape the reservoir water to become vented, the proportion of boiler heat vented to the atmosphere is increased. This increase is substantial. Correspondingly, the quantity of heated reservoir water that must be discharged through overflow pipe 32 to maintain a proper heat balance in the reservoir water may be and is reduced.

As a practical matter, operation of stirrer blades 102 distinctly increases the temperature differential between the steam inside condenser coil 27 and the water in reservoir container 10 adjacent condenser coil 27. It should be appreciated that although the decreased pressure zones on the downstream faces of stirrer 102 are localized and are transient in nature, more is not needed to create a bubble wherein part of the heated reservoir water flashes into steam, concurrently significantly cooling the reservoir water adjacent the bubble (through loss therefrom of the heat of vaporization for the steam). Since the steam bubble and the hot reservoir water can coexist at the sub-atmospheric pressure level generated by the stirrer 102, the bubbles form readily and do not collapse immediately when normal pressure is restored. Mostly, the steam bubbles escape over head of the reservoir.

Of course, the stirrer is in constant motion, mixing the reservoir water quite thoroughly so that distinct zones of temperature differences never can become established in the reservoir water. However, generation of the steam from the localized (and transitory) reduced pressure zones is virtually instantaneous. Once the bubble is formed, its collapse, however, is not instantaneous so that the bubbles last long enough to rise up through the reservoir water and escape through the surface thereof. Since the reservoir water is hot, desirably in the 180°-190° F. range, a substantial partial pressure of steam exists, which is to say, that the stirrer generates many steam bubbles and in total the steam bubbles remove a considerable quantity of heat energy from the reservoir water.

Thus, generating a micro environment of transitory sub-atmospheric pressure zones at the downstream face of the stirrer 102 generates a significant change in the macro environment of the reservoir. The temperature of the water in the reservoir as a whole is reduced by the flashing of steam to form the bubbles. Although only the water adjacent the bubbles becomes cooler, the rapid swirling water movement caused by stirrer 102 mixes the water almost immediately so that the temperature of the reservoir water overall has been reduced. Moreover, the cooler reservoir water is adjacent the condenser coil tubing. Thus, a better temperature differential between the condenser coil and the reservoir water is generated and maintained by the stirring improving thereby, the operation of condenser 27.

Another important overall practical effect of the stirring to remove more of the boiler heat overhead of the reservoir is to save water. Less of the boiler heat must be removed by discarding water through overflow pipe 32. The proportion of the feed water in the distillation apparatus that must be discarded through overflow pipe 32 is reduced substantially by inclusion of stirrer 102 in the distillation apparatus.

A test version mode of the distillation apparatus illustrated herein was made and tested without the stirrer in operation (reservoir depth 5½"). Convection was relied upon for stirring. The temperature at the bottom of the reservoir was 160° F. The temperature at the surface of the reservoir was 180° F. The temperature of the distillate product was 200° F., and an appreciable amount of steam was being produced along with the distillate. About 2.5 gallons of cooling water per gallon of distillate product was being used. Then, when the stirrer was operated the temperature of the distillate rapidly became reduced to below about 155° F. Then, to raise the temperature in the reservoir to above 180° F. the ratio of cooling water to distillate was reduced from the 2.5 to 1 to about 1.2 to 1. The distillate temperature rose to above 190° F. Then, operation of the stirrer was discontinued, whereupon the outlet of the condenser steamed profusely. Then, the stirrer was turned on again and the system returned to normal.

As has already been pointed out, a mechanical expedient to facilitate maintenance of a distinct temperature across the condenser coil tubing is illustrated in FIG. 5. Shown there is an enlarged partial cross-section of condenser coil tubing. Inside the tubing is a deflector 77 whose purpose is to generate spiral flow movement of steam and condensate to the tube wall. Also, flow becomes more turbulent thereby helping heat exchange across the tube wall. A like deflector 79 may be provided in the conduit connecting reservoir container 10 and boiler 12 (see FIG. 6). The purpose of deflector 77 is, of course, to create turbulent mixing of the water so as to avoid any temperature stratification either in reservoir container 10 or in boiler 12.

An additional optional expedient which has been found advantageous in practice of this invention is the provision of a filter, preferably an oversized filter, at the condenser outlet 31. In the embodiment illustrated herein the oversized filter 115 is a carbon filter.

Filter 115 absorbs any organic materials that are carried over with the condensate. It polishes the condensate, so to speak but also it achieves a superior aeration for the condensate.

As has already been pointed out the distillation apparatus of this invention operates in a pulsating fashion causing water to flow through the connecting conduit 22 back and forth between boiler 12 and reservoir 12. The same pulsations affect condenser 27. A pulse of (steam) pressure from boiler 12 passes through the condenser tubing in a forward direction during a steam generation pulse, sending condensate out through filter 115. Then during the reverse suction pulse, air is drawn into the filter 115, and even into the outlet end of condenser 27. Thus, the filter 115 acts as much to filter air drawn into the condenser tubing, as it does to filter distillate leaving the condenser tubing.

Manifestly, the pulses are not equal in their effect. Steam is being generated in boiler 12, then is condensed in condenser coil 27. The distillate is discharged at the outlet 31 through filter 115. A net movement outflow movement of distilled water through filter 115 results. At the same time, a small net inflow of air into filter 115 and condenser 27 results. The distillate, e.g., at 190°-195° F., is hot enough to heat filter 115 and prevents microbial contamination of the filter. This means that air which enters oversized filter 115 during the suction pulses is retained therein and becomes sterilized by the hot filter before entering condenser 27 and/or becoming absorbed in the distillate. The reason for providing a filter 115 that is oversized is precisely to increase the residence time therein of the inflowing air. Overall, the result is that air heated and sterilized in filter 115 partially aerates the distilled water improving the palatability thereof.

Surprisingly, the operation of filter 115 to sterilize and filter aeration air is connected to the operation of stirrer 102.

Stirring the heated reservoir water is believed to completely deaerate the reservoir water as well as strip any volatilizable materials therefrom before the reservoir water is admitted into boiler 12. Accordingly, the water in the boiler 12 and the steam entering condenser coil 27 and the condensate water in the coil 27 is essentially free of air. Therefore, the condensed distillate is capable of absorbing air or any other gas quite readily. The steam pressure pulses which cause back and forth water flow in conduit 22 and which also generate a comparable back and forth flow of air and condensate in filter 115, and condenser 27. Some of the air seems to pass through the condenser 27 and enters boiler 12. In any event, a small net inflow of air into filter 115 happens.

The net inflow of air into filter 115 is caused by the completely deaerated nature of the distillate. Notwithstanding, that the distillate is hot it absorbs some air. Taste tests on the distillate indicate that the distilled water product from the distillation apparatus of this invention is not as flat as typical distilled water.

It is noted that the condensation product of the distillation apparatus leaves at near to the temperature of the reservoir water, and absent devolitilization due to the stirring would contain about the same air content as remains in the heated reservoir water. This is because (absent the superior deaeration obtained by stirring) the water entering boiler 12 would contain some residual air and then most, if not all, the same residual air would be reabsorbed into the distillate in condenser 27. Since all such residual air has been removed by the stirring, it becomes replaced by sterile filtered air.

While only certain embodiments of the invention have been illustrated and described herein, it is understood that alterations, changes, and modifications may be made therein without departing from the true scope and spirit thereof.

What is claimed is:

1. A method for producing a distilled water product that is at least partially aerated which comprises providing a distillation apparatus including a water reservoir container having a water inlet and outlet thereto connected so as to create a reservoir of water therein and a boiler smaller than the reservoir container with an open connection between container and boiler for water flow to or from the boiler, a steam line overhead of the water level in the boiler leading to a condenser immersed in the reservoir and an outlet from said condenser for discharge of condensate, the distillation apparatus further including a filter at the outlet of said condenser for filtering the condensate and for sterilizing and filtering any air entering said filter through reverse flow, and a mechanically operated stirrer in the reservoir to cause swirling in the reservoir water and generation of steam bubbles therein; maintaining a predetermined level of reservoir water by introducing feed water into and removing water from said container at a flow rate which maintains a temperature in the range of about 180°–190° F. in the reservoir and heating the water in said boiler to generate steam, the steam passing into said condenser to be condensed therein by heat exchange against the reservoir water whereby the reservoir water becomes heated while at the same time mechanically stirring the water of said reservoir so as to cause generation of steam bubbles in the reservoir water whereby the heated reservoir water becomes devolatilized and deaerated prior to entering said boiler, and passing air into said filter whereby devolatilized water converted into steam in said boiler and thereafter condensed in said condenser to become the distilled water product absorbs filtered and sterilized air during passage through the condenser and through the filter.

2. The method of claim 1 wherein the boiler periodically generates more steam than can be accommodated by the condenser thereby causing a pulsation wherein water is force to flow out of the boiler back into the reservoir by steam pressure, and then the steam pressure pulse is dissipated whereupon water flows back into the boiler from the reservoir, said pulsation also causing periodic flow of condensate out of the condenser and periodic flow of air into said filter.

* * * * *